US008490885B2

(12) United States Patent
Lamb et al.

(10) Patent No.: US 8,490,885 B2
(45) Date of Patent: Jul. 23, 2013

(54) INTEGRATED FREEZE PROTECTION AND PRESSURE RELIEF VALVE (75) Inventors: Kevin Lamb, West Hartford, CT (US); Kenneth Lionello, Waterbury, CT (US); Michael J. Nihan, Northfield, CT (US)

(73) Assignee: Rostra Vernatherm LLC, Bristol, CT (US)

( * ) Notice: Subject to any disclaimer, the term of this patent is extended or adjusted under 35 U.S.C. 154(b) by 721 days.

(21) Appl. No.: 12/766,331

(22) Filed: Apr. 23, 2010

(65) Prior Publication Data
US 2010/0200783 A1 Aug. 12, 2010

Related U.S. Application Data (63) Continuation-in-part of application No. 12/221,946, filed on Aug. 7, 2008, now abandoned.

(51) Int. Cl.
*G05D 23/02* (2006.01)
*F24J 2/40* (2006.01)
*E03B 7/10* (2006.01)
*F16K 15/00* (2006.01)

(52) U.S. Cl.
USPC ........... 236/93 R; 126/588; 126/595; 137/62; 137/512.3

(58) Field of Classification Search
USPC ........... 236/93 R, 93 A, 100; 251/11; 137/62, 137/468, 615, 616, 614, 614.18, 512.3; 126/585, 126/588, 594, 595
See application file for complete search history.

(56) References Cited

U.S. PATENT DOCUMENTS

| 4,853,134 A * | 8/1989 | Cure et al. ............... 210/742 |
| 6,772,958 B1 * | 8/2004 | Lamb et al. ............... 236/34.5 |
| 2001/0010210 A1 * | 8/2001 | Chamot et al. ............ 123/41.1 |

* cited by examiner

*Primary Examiner* — Chen Wen Jiang
(74) *Attorney, Agent, or Firm* — Alix, Yale & Ristas, LLP (57) ABSTRACT

A thermally actuated valve employs a plunger and bore valve configuration. A thermally expansible wax actuator has an axial length that changes in response to the temperature in a cavity of the valve. At temperatures above a predetermined set point, the actuator produces axial force sufficient to extend the length of the actuator against a return bias and project the plunger and seal into the bore, closing the valve. The plunger defines a pressure relief fluid flow path from the valve cavity to the valve outlet. A pressure relief valve is arranged in the plunger and is responsive to pressure in the valve. The pressure relief valve opens to relieve pressure above a pre-determined level. The thermally actuated valve and the pressure relief valve are coaxial and employ a common outlet.

19 Claims, 5 Drawing Sheets

INTEGRATED FREEZE PROTECTION AND PRESSURE RELIEF VALVE

CROSS REFERENCE TO RELATED APPLICATIONS

This application is a continuation in part of U.S. application Ser. No. 12/221,946, filed Aug. 7, 2008.

TECHNICAL FIELD

The present disclosure relates to an integrated thermally actuated control valve and pressure relief valve for use in solar hot water systems. The thermally actuated valve controls the opening and closing of a fluid connection to prevent freezing in a water circulation system. The integrated pressure relief valve prevents excess pressure accumulation.

BACKGROUND

Solar hot water systems use various collectors or panels exposed to sunlight to accumulate heat energy in a working fluid circulated through the collector or panel. Some solar hot water systems circulate fresh water through the collector or panel in temperate climates where freezing temperatures are unusual. Freeze protection valves are employed in fresh water solar systems to prevent freeze damage to the collectors. Conservation of fresh water resources is important wherever such systems are used, so limiting the amount of flow necessary to prevent freeze damage to a minimum is a priority.

Depending on solar hot water system design and operating conditions, temperatures in the collector or panel can exceed the boiling point of water and produce potentially damaging pressures in the system. This can occur whenever water is not circulating in a collector exposed to hot sun. Typical solar hot water systems include a pressure relief valve to bleed off pressure in excess of a predetermined amount to prevent system damage. The pressure relief valve is separate from and in addition to the freeze protection valve.

The use of wax-filled actuators, otherwise referred to as wax motors, as thermally actuated control devices in fluid circulation systems is well known. Wax motors have been employed as actuators for valves employed to prevent fluid sources from freezing when the temperature drops. Such valves are designed to open or close in response to a predetermined change in temperature. Wax motors require no external power source, are reliable, extremely compact and powerful for their size.

Wax motors typically include a housing having a chamber filled with thermally responsive wax contained beneath a flexible diaphragm. The wax expands as temperature increases, exerting force on the diaphragm and on a reciprocating piston disposed on the other side of the diaphragm. Movement of the piston is controlled by a guide extending from the actuator housing. The wax motor is constructed such that known changes in temperature produce predetermined axial movement of the piston with respect to the housing.

Wax motor-actuated freeze protection valves are known where the piston is seated against a stop and the housing moves in response to changes in temperature. The housing carries a poppet that fits in a seat to control fluid flow. A return spring biases the housing and poppet away from the seat. At temperatures above freezing, the actuator exerts a force on the piston which moves the housing and poppet toward the seat against the bias of the return spring. At a predetermined temperature, typically above approximately 35° F., the force generated by the wax motor overcomes that of the return spring so that the poppet reaches the seat and the system is closed.

The intensity of the force generated by the wax motor changes with temperature, causing the actuator housing and poppet to move with respect to the valve seat at temperatures well above freezing. In freeze protection valves, the poppet must remain in the closed position over a wide range of greater than freezing temperatures while the actuator moves in response to temperature changes. Known valves of this type incorporate a poppet sub-assembly which accommodates actuator movement while maintaining the poppet in contact with the seat. The poppet sub-assembly includes a poppet retainer and poppet spring which allow the poppet to move independently of the actuator housing while the valve is closed. The retainer limits movement of the poppet toward the seat and the poppet spring defines the pressure exerted by the poppet on the seat. Thus, the poppet and seat remain stationary and sealed while the actuator housing moves in response to changes in temperature. The necessity for a poppet sub-assembly complicates both valve assembly and operation.

Consequently, there exists a need for a wax motor-actuated freeze protection valve that employs a simplified mechanism to remain closed over a range of temperatures.

There is also a need for a simple and reliable freeze protection valve that accurately opens to prevent freezing, while minimizing leakage at near freezing temperatures to reduce waste of water.

SUMMARY

The disclosure relates to a thermally actuated freeze protection valve of simplified construction and enhanced functionality. A housing defines an inlet, outlet and longitudinal cavity which houses a wax-filled actuator. A fluid flow channel connects the cavity and outlet. The actuator body includes a cup defining a wax reservoir and a guide for controlling axial movement of the piston. The actuator piston is seated against the housing, with the actuator body moving in the cavity in response to temperature changes. A return spring is arranged to bias the actuator body toward the piston.

Instead of the conventional poppet and seat valve construction, the disclosed freeze protection valve employs a plunger and bore valve configuration. In a disclosed embodiment, the plunger integrally extends from the actuator body and carries an O-ring seal seated in a circumferential groove. The disclosed plunger and bore are circular in cross-section, but are not limited to such a configuration. A circumferential wall projects into the cavity from the channel to define the bore. At above freezing temperatures, the actuator produces axial force on the piston sufficient to overcome the return spring and project the plunger and O-ring seal into the bore. The bore entrance and plunger include complementary beveled surfaces to facilitate alignment and entry of the plunger and seal into the bore. When the plunger is inside the bore, the O-ring seal is compressed between the inside surface of the bore and the plunger. The O-ring seal is compressed in a direction perpendicular to the direction of actuator movement. The sealing compression of the O-ring seal is independent of the force generated by the actuator.

The plunger defines a pressure relief fluid flow path from the valve cavity to the valve outlet. A pressure relief valve is arranged in the plunger and is responsive to pressure in the valve. The pressure relief valve opens to relieve pressure above a pre-determined level. The thermally actuated valve and the pressure relief valve are coaxial and employ a common outlet.

The plunger and bore are configured with an axial length sufficient to accommodate movement of the actuator body at above freezing temperatures. This configuration allows the actuator, plunger and seal to move in response to changes in temperatures, while the valve remains closed. At a predetermined temperature, typically about 35° F., the wax in the actuator contracts, allowing the plunger and seal to axially disengage from the bore under the influence of the return spring, thus opening a fluid flow pathway between the inlet and the outlet. So long as temperatures remain below the predetermined value, the valve will remain open.

The disclosed valve configuration permits reciprocation of the plunger over a range of temperatures while the valve remains closed. The disclosed valve configuration eliminates the need for numerous additional mechanical elements found in known freeze protection valves.

DETAILED DESCRIPTION OF THE PREFERRED EMBODIMENTS

Figure 1:
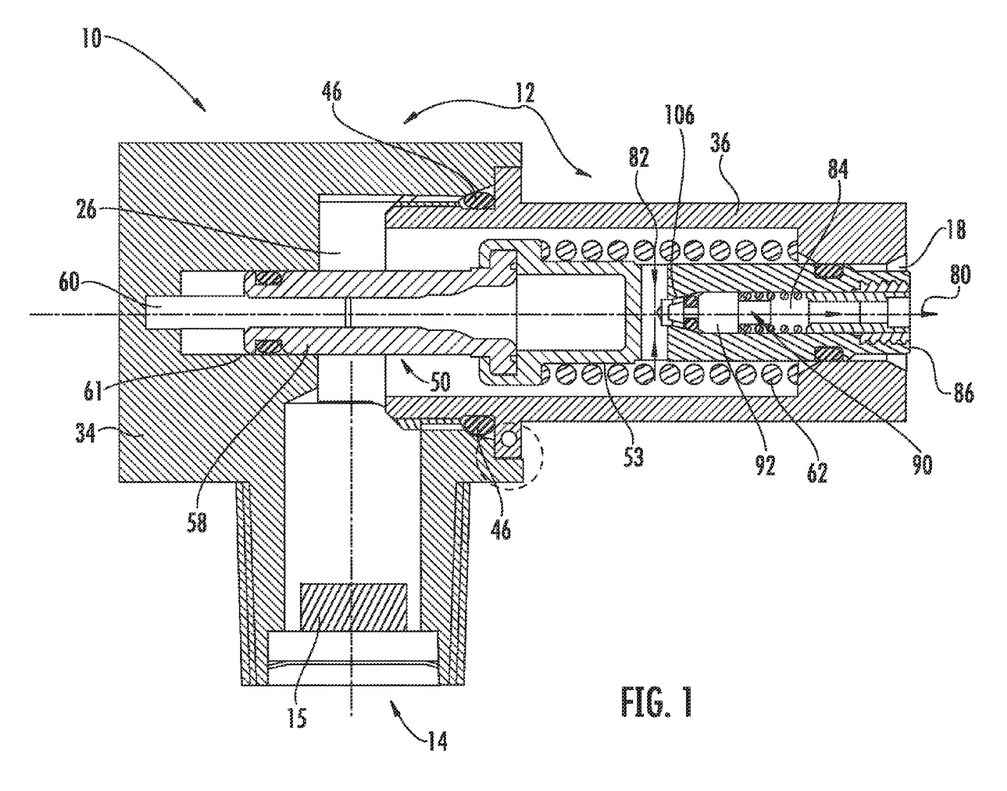
FIG. 1 is a longitudinal sectional view through a first embodiment of a freeze protection valve according to aspects of the present disclosure.

An embodiment of an integrated freeze protection and pressure relief valve (hereafter "the valve") according to aspects of the present disclosure will now be described with reference to FIGS. 1-5. Referring to FIG. 1, the freeze protection valve 10 has a housing 12 which includes an inlet 14, an actuator cavity 26 and an outlet 18. In the disclosed embodiment, the housing 12 has a relatively L-shaped side profile, but is not limited to such a configuration. The housing 12 includes an inlet 14 which defines a fluid entry flow path 16 communicating with the actuator cavity 26 and an outlet 18 which defines a fluid discharge flow path 20. The inlet 14 and outlet 18 may include threaded surfaces to facilitate integration of the valve 10 into fluid circulation systems. The disclosed embodiment also includes a filter or screen 15 positioned at the inlet 14 to prevent entry of particulates that may interfere with valve function.

Figure 2:
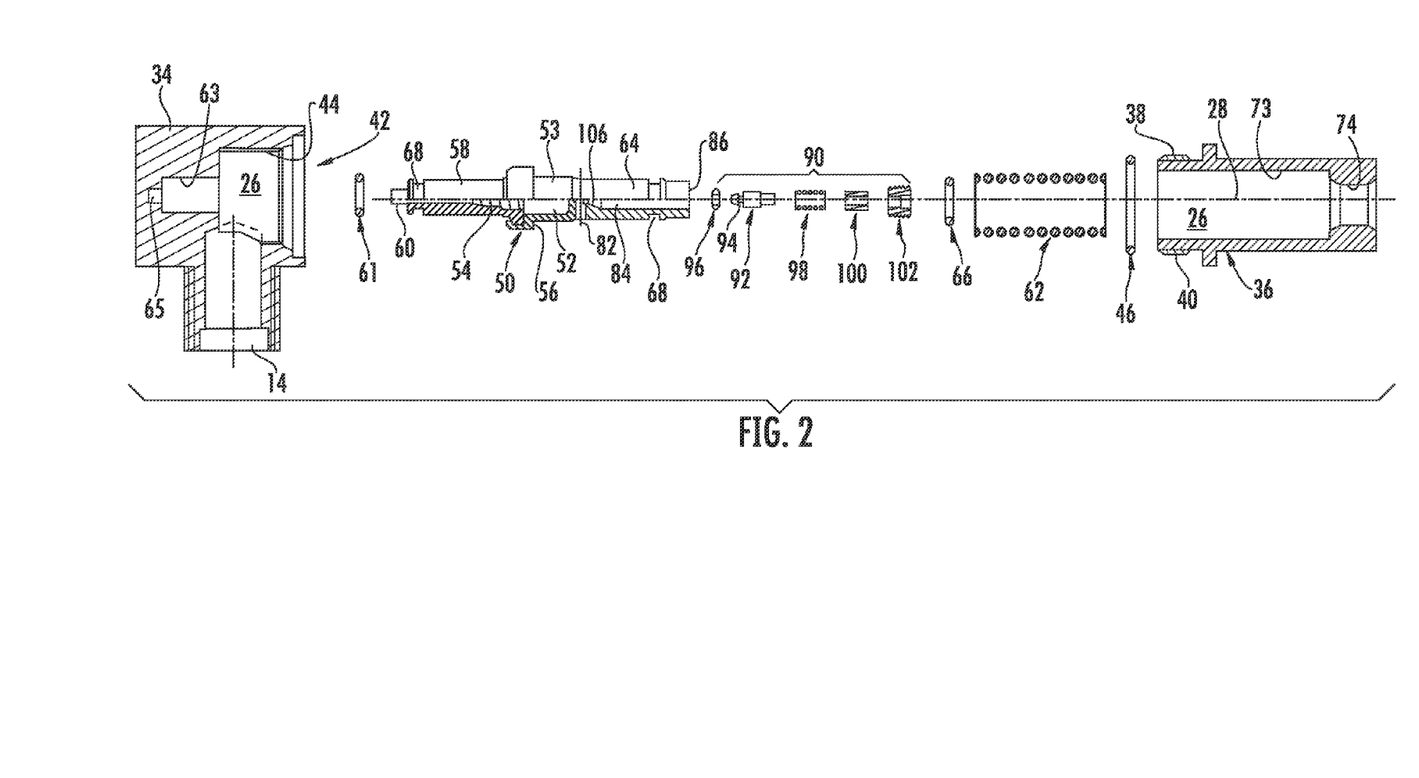
FIG. 2 is an exploded preassembly sectional view of the freeze protection valve of FIG. 1.

As shown most clearly in FIG. 2, the disclosed freeze protection valve 10 features a housing 12 assembled from upper and lower portions, 34 and 36, respectively. The lower portion 36 has a projection 38 with a threaded outside surface 40. The upper portion 34 has an opening 42 and internal threaded surface 44 complementary to the projection 38 and external threaded surface 40 of the lower portion 36. The upper housing portion 34 is sealed to the lower housing portion 36 by an O-ring 46 arranged and compressed between radially opposed surfaces of the upper and lower portions 34, 36 as shown in FIG. 1. The upper and lower housing portions 34, 36 are molded from plastic formulated to withstand outdoor temperature extremes and long-term exposure to UV from sunlight. Suitable plastic formulations are commercially available. The connection between the housing upper and lower portions 34, 36 may alternatively be an adhesive bond, a sonic weld or other suitable method of joining.

As shown in FIG. 1, disposed within the cavity 26 is a wax-filled actuator 50 (which may alternatively be referred to as a "wax motor") with a longitudinal axis that corresponds generally with the cavity axis 28. The actuator 50 includes a body 51 which defines a cup 53, and a guide 58 for controlling axial movement of a piston 60 relative to the body 51. The actuator cup 53 contains a reservoir of wax material 52 which expands and contracts in response to temperature changes in a known manner. A flexible diaphragm 54 is positioned within the actuator body 51 to retain the wax 52 within the cup 53 and transmit force from the wax 52 to the piston 60, which results in axial movement of the piston 60 relative to the actuator body 51. In the disclosed valve 10, the guide 58 and cup 53 are constructed of brass, while the piston is stainless steel. Housing portion 34 includes two coaxial bores 63, 65 arranged to receive the guide 58 and the end of the piston 60, respectively. The piston 60 remains in fixed position with respect to the housing 12, while the guide 58 reciprocates in the bore 63. The guide 58 includes a circumferential groove 59 which carries an O-ring seal 61 which is compressed between the inside surface of the bore 63 and the guide 58 to prevent fluid penetration into the area behind the guide 58. Preventing fluid from getting behind the guide lessens the chance of corrosion on the guide 58 or piston 60. The sliding relationship between the guide 58, O-ring seal 61 and bore 63 serve to control axial movement of the actuator body 51 with respect to the housing 12. The lower housing portion 36 includes coaxial bores 73, 74. Bore 73 surrounds a majority of the actuator chamber 26 inside the valve 10. Bore 74 defines the outlet 18 and receives the forward end of the actuator 50, described in greater detail below.

The actuator 50 shown in FIGS. 1 and 2 has a shoulder 56 projecting outwardly from the body 51. A return member 62 is engaged with the actuator body 51 at the shoulder 56 and biases the body 51 away from the outlet 18. In the disclosed embodiment, the return member 62 is a coil spring, but other forms of bias member are compatible with the disclosed valve 10. The spring's bias force is designated as $F_2$ in FIG. 4. The return spring force $F_2$ is opposed by force $F_1$ generated by the wax 52 on the piston 60 seated against the housing upper portion 34 as shown in FIG. 1. As is known in the art, thermally responsive wax can be formulated to expand to generate the actuation force $F_1$ over a broad range of temperatures.

In the disclosed embodiment, the body 51 of the actuator is extended axially to include a plunger 64. The plunger 64 integrally extends from the actuator body 51 and carries an O-ring seal 66 seated in a circumferential groove 68. Other arrangements, such as a mechanical connection between the actuator body 51 and the plunger 64 are compatible with the disclosed valve 10. In this embodiment, the bore 74, plunger 64 and seal 66 are configured with circular cross sections, though they are not limited to such a configuration. The plunger 64 and seal 66 are connected to the actuator body 51 for axial movement therewith.

In the disclosed valve 10, expansion of the thermally responsive wax 52 within the actuator cup 53 due to a temperature increase produces an axial force $F_1$ upon the body 51 that is sufficient to overcome the opposite axial force $F_2$ of the return member 62 and project the plunger 64 and O-ring seal 66 into the bore 74 defining the outlet 18. At a predetermined temperature, generally above 35° F., the force $F_1$ produced by the wax 52 expansion is sufficient to project the plunger 64 and O-ring seal 66 into the bore 74. As seen most clearly in FIG. 2, the bore entrance and the end of the plunger have complementary beveled edges 70, 71 to facilitate alignment and entry of the plunger 64 and seal 66 into the bore 74. When inside the bore 74, the O-ring seal 66 is compressed between the inside surface of the bore 74 and the plunger 64. The O-ring seal 66 is compressed in a direction generally perpendicular to the direction of actuator movement, thus closing the fluid flow path between the inlet 14 and outlet 18 through cavity 26. The sealing compression of the O-ring seal 66 is independent of the forces $F_1$ and $F_2$ generated by the actuator 50 and the return member 62. Conversely, the thermally responsive wax 52 contracts with a falling temperature below a predetermined value and allows the return member 62 to move the plunger 64 and O-ring seal 66 away from the bore 74 defining the outlet 18. At a predetermined temperature, the force $F_2$ exerted by the return member 62 on the actuator body 51 is greater than the actuation force $F_1$ generated by the actuator 50 so the plunger 64 and O-ring seal 66 are withdrawn from the bore 74, opening the valve so fluid flows between the inlet 14 and outlet 18 through the cavity 26. Although an O-ring seal is illustrated, other sealing configurations between the plunger 64 and bore 74 are compatible with the disclosed valve 10.

The disclosed valve 10 will spend most of its working life in the closed position, with the plunger 64 and seal 66 received in the bore 74 to prevent fluid flow through the valve. The actuator contains a wax material 52 which changes state from a liquid (expanded) to a crystalline solid (contracted) in response to a pre-determined reduction in temperature. The wax 52 goes through a reverse transition from crystalline solid (contracted) to liquid (expanded) in response to a predetermined increase in temperature. The disclosed valve 10 is constructed to open as temperatures fall through the range from about 36° F. to 32° F., with the wax changing state from liquid (expanded) to solid (contracted). In its solid state, the wax 52 occupies less space within the cup 53, reducing pressure $F_1$ on the piston 60, which allows the plunger 64 and seal 66 to withdraw from the bore under the influence of the return member 62. The disclosed actuator 50 is calibrated in a manner known in the art by altering the volume of the cup to establish an actuator length at a known temperature so that the plunger 64 and seal 66 are accurately positioned relative to the bore 74. The actuator 50 is calibrated so that the seal 66 leaves the bore 74 at approximately 35° F., allowing fluid to begin flowing through the valve 10.

Figure 5:
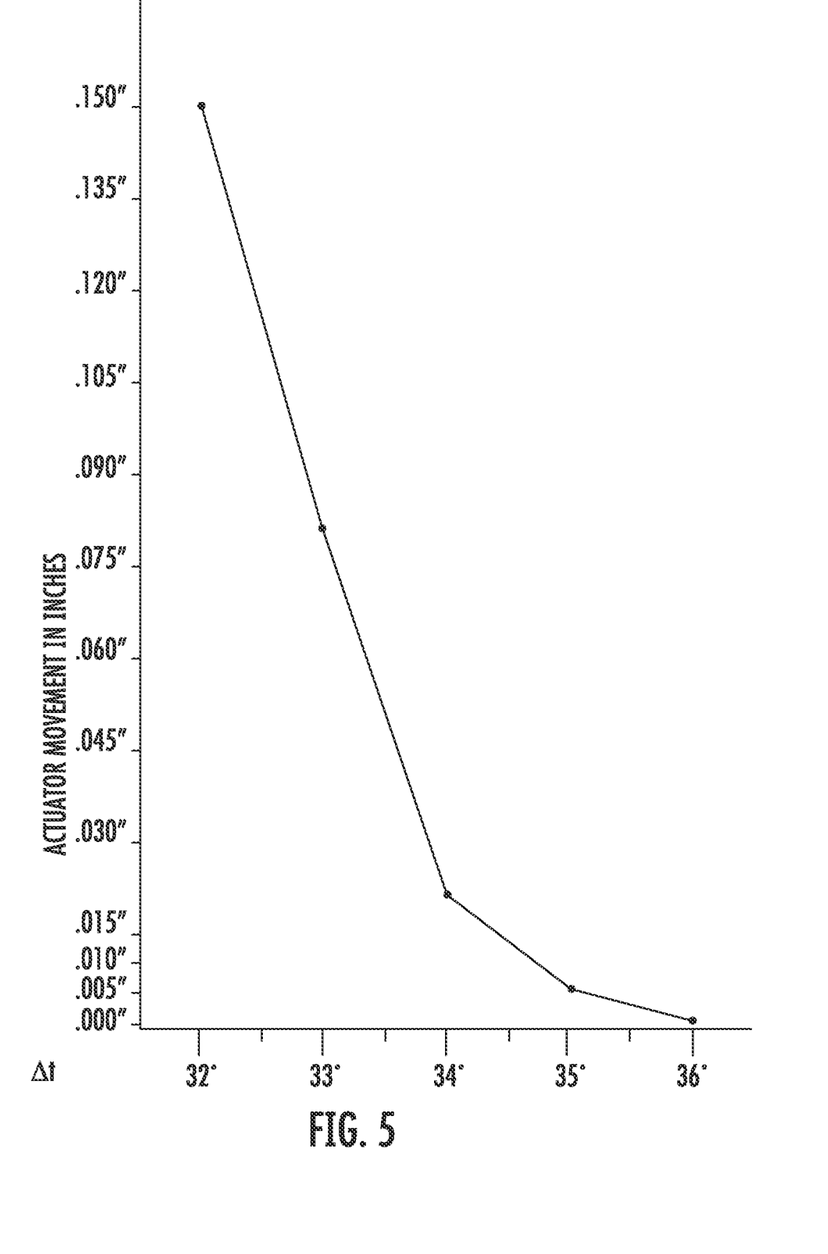
FIG. 5 is a graphical presentation of actuator travel with respect to temperature change illustrating aspects of the disclosed freeze protection valve.

The disclosed exemplary freeze protection valve 10 is configured to produce approximately 0.150" movement $\Delta D_1$ of the plunger 64 and seal 66 with respect to the bore 74 between 36° F. and 32° F. In the disclosed freeze protection valve, the wax material 52 is formulated to begin its transition from liquid (expanded) to solid (contracted) when the temperature of fluid in the cavity 26 surrounding the actuator 50 is approximately 36° F. and complete that transition when the temperature in the cavity is approximately 32° F. The wax material 52 is formulated so that a majority of the transition and the associated movement occurs between 34° F. and 32° F. An exemplary embodiment of the disclosed freeze protection valve divides actuator movement as follows: 5% of actuator movement occurs between 36° F. and 35° F., 10% of actuator movement occurs between 35° F. and 34° F., 40% of actuator movement between 34° F. and 33° F. and 45% of actuator movement between 33° F. and 32° F. FIG. 5 is a graph showing actuator movement with respect to temperature for the disclosed exemplary embodiment of the valve 10. This valve configuration regulates the flow of water through the valve, with maximum flow occurring at temperatures presenting the greatest risk of freeze damage. The axial force generated by the actuator, the axial length of the actuator (movement of the plunger with respect to the bore) and the flow rate through the valve are all non-linear. The valve is configured to produce the greatest flow rate and greatest rate of increase in the flow rate as temperatures decline toward 32° F.

At temperatures between 35° F. and about 150° F. the wax 52 remains in its liquid (expanded) state, pushing the piston 60 away from the wax 52 and generating force $F_1$ to maintain the valve in the closed position, with the plunger 64 and seal 66 received in the bore 74. Thermal expansion of the wax and actuator materials at temperatures above 35° F. produces approximately 0.001" of actuator movement for each 1° F. to 2° F. increase in temperature. The bore 74 and plunger 64 of the disclosed valve 10 are configured to accommodate at least approximately 0.050" of movement $\Delta D_2$ of the plunger 64 and seal 66 inside the bore 74 while the valve remains closed. This configuration prevents accumulation of force within the valve due to thermal expansion at high temperatures, which movement is illustrated as $\Delta D_2$ in FIG. 4. The seal 66 is laterally compressed between the plunger 64 and the bore 74 in a direction perpendicular to actuator movement. Sealing engagement between the plunger 64 and the bore 74 is independent of temperature while the valve is in the closed position.

Figure 3:
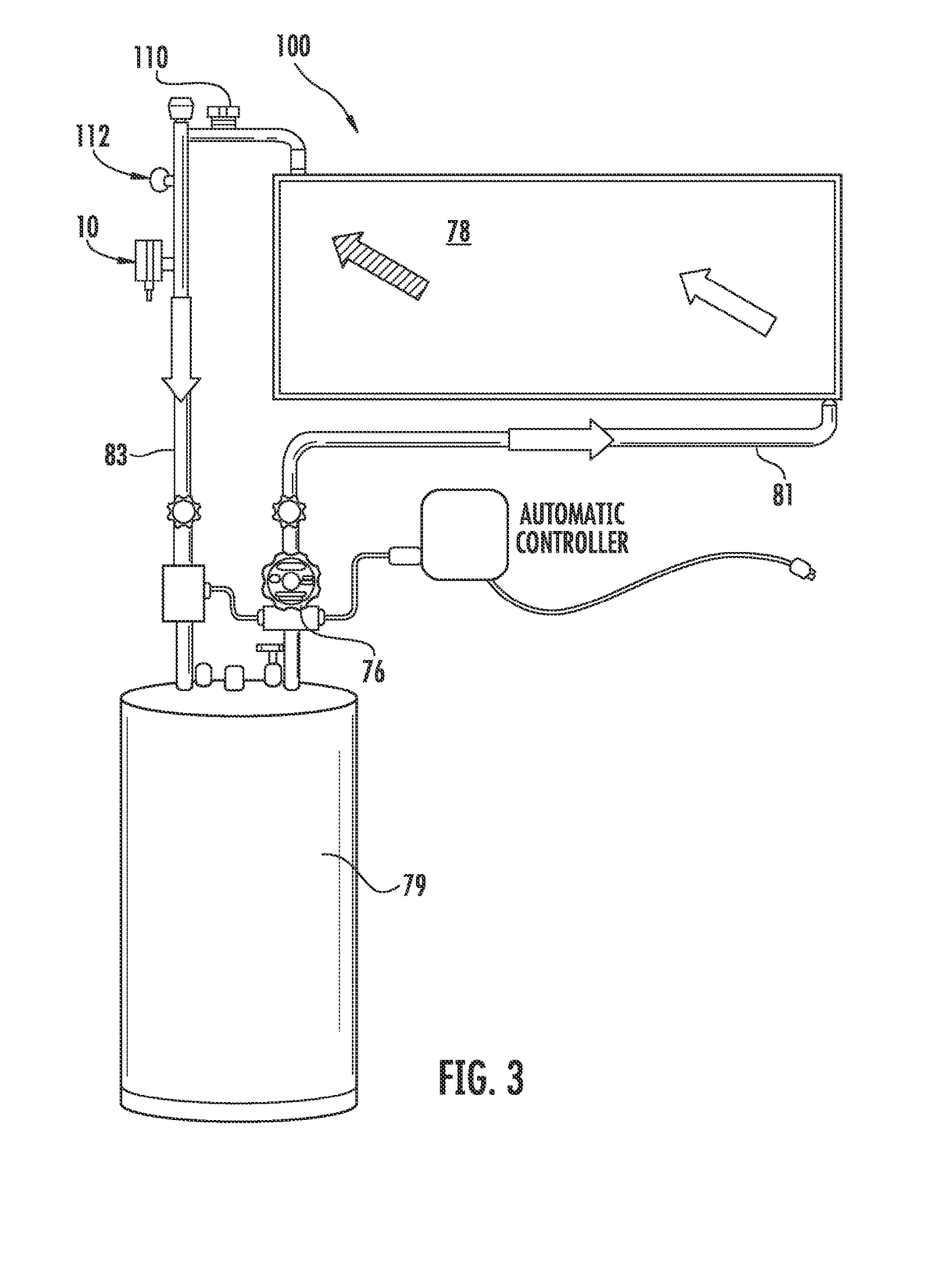
FIG. 3 is a schematic diagram of a pump system with the freeze protection valve of FIGS. 1-2 installed on the return side.

FIG. 3 illustrates a typical installed configuration for the disclosed valve 10. The valve 10 serves a freeze protection function is installed in a pump fed, fresh water solar hot water system 100 as known in the art. As can be seen, the system 100 includes a pump 76, solar collectors 78 and storage tank 79 connected via water lines 81 and 83. The valve 10 is arranged in the system 100 to allow near freezing water to drain from the solar collectors 78 and be replaced by warmer water to prevent freeze damage. The valve 10 is installed on the exit side of the solar collectors 78 in a location where it is exposed to the coldest ambient temperature. For optimal performance, the valve 10 is installed in an upright position.

In general and as described above, the freeze protection valve 10 opens upon a drop in temperature to allow water that is near freezing to be discharged 80 and replaced with warmer water 82. The coldest temperatures typically occur in the early morning hours before dawn. The water circulated to replace the discharged cold water is typically coming from within the building to which the solar hot water system is attached and is therefore significantly warmer than the outside temperature. The warm water expands the wax in the actuator, closing the freeze protection valve as described above. The cooling, opening, warming, closing cycle repeats until the ambient temperature exceeds approximately 35° F., above which temperature the freeze protection valve remains closed.

Figure 4:
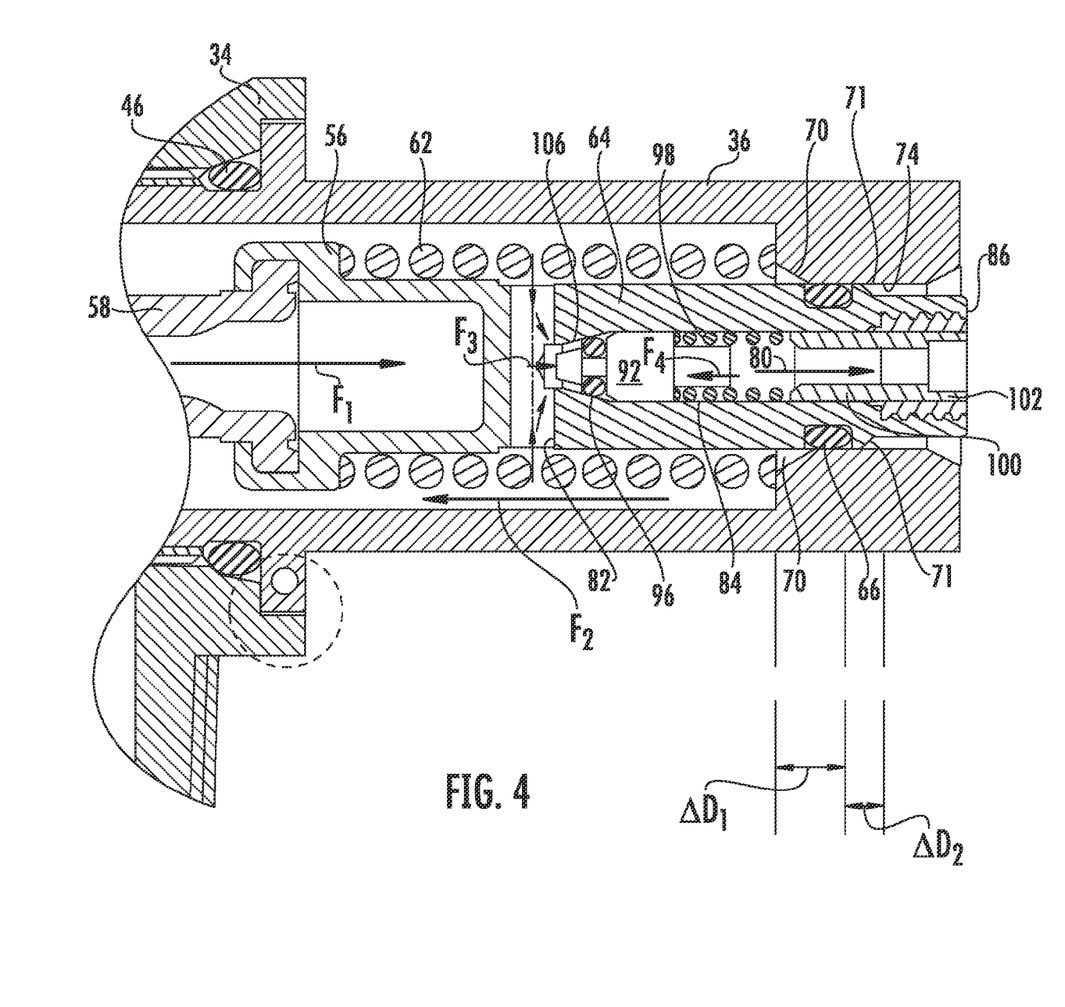
FIG. 4 is a longitudinal sectional view through the freeze protection valve of claims 1-2 illustrating the direction of actuation force $F_1$, return spring force $F_2$, actuation range of movement $\Delta D_1$ and range of actuator movement at greater than freezing temperatures $\Delta D_2$.

As best illustrated in FIG. 4, the actuator body 51, plunger 64 and seal 66 move through a distance $\Delta D_1$ with respect to the bore 74. As described above, the valve 10 remains closed over a range of temperatures above about 35° F. The plunger 64 and seal 66 are configured to accommodate thermal expansion of the wax and actuator components, which produce additional movement $\Delta D_2$ of the actuator body 51, plunger 64 and seal 66 with respect to the bore 74. The disclosed configuration of the bore 74 and its interaction with the plunger 64 and O-ring seal 66 eliminate the need for a poppet subassembly while retaining the functionality of the sub-assembly.

FIG. 3 illustrates a conventional active open loop solar domestic hot water heating system 100 including a solar collector 78, hot water storage tank 79, a pump and an automatic controller. The pump 76 circulates water from the storage tank 79 to the solar collector 78 and back according to predetermined criteria. Generally speaking, when the temperature of water in the solar collector 78 is greater than the temperature of water in the storage tank 79, the controller circulates water to accumulate hot water in the storage tank. The return line 83 from the solar collector to the storage tank includes an air vent 110, a pressure relief valve 112 and a freeze protection valve (here illustrated as combination valve 10). The present disclosure relates to a freeze protection valve having integrated pressure relief functionality. Integrating the pressure relief function into the freeze protection valve eliminates the need for a separate pressure relief valve.

In the disclosed actuator 50, the piston 60 extends from a first (guide) end of the actuator body 51 and is seated in bore 65 in fixed relationship with the housing part 34. The actuator body 51 (guide 58, cup 53 and plunger 64) move relative to the piston 60 and housing 12 in response to changes in the volume of the wax 52 contained in the cup 53 and the axial force $F_1$ exerted by the wax against the piston 60. The second (plunger) end of the actuator body 51 includes an axially extending plunger 64 which carries an O-ring seal 66. The second (plunger) end of the actuator body 51 defines a pressure relief fluid flow path 80 extending from the actuator cavity 26 to the outlet 18. In the disclosed embodiment, the pressure relief fluid flow path 80 includes a transverse bore 82 through the plunger in communication with an axial bore 84 extending between the transverse bore 82 and the axial (outlet) end 86 of the plunger 64.

A pressure relief valve 90 is assembled inside the axial bore 84 portion of the pressure relief fluid flow path 80 and exposed to the pressure in the actuator cavity 26 via the transverse bore 82. The pressure relief valve 90 includes a needle 92 having a circumferential groove 94 carrying a seal 96, a bias spring 98, a spacer 100 and a retainer screw 102. In the disclosed embodiment, the retainer is a set screw which is retained in place by a pin 104 passing through the outlet end portion of the plunger 94 so the retainer screw 102 cannot rotate with respect to the plunger 64. The pressure relief valve 90 is adjusted by rotation of the retainer screw 102 relative to the plunger 64 to vary the bias force against the needle 92 and seal 96. The pin 104 fixes the retainer screw 102 and preserves the position of the retainer screw, spacer 100 and bias spring 98 so the adjusted bias exerted on the needle 92 and seal 96 is consistent over time. The end of the axial bore 84 portion of the pressure relief fluid flow path 80 defines a conical valve seat 106. A sealing end of the needle 92 has a complimentary conical configuration arranged so that the O-ring seal 96 carried by the needle 92 seals against the seat 106. The bias spring 98, spacer 100 and retainer screw 102 are selected to apply a known range of pressures to the needle 92 and seal 96. The disclosed pressure relief valve 90 configuration results in pressure relief valve 90 adjustable to actuate at a predetermined pressure between about 50-200 psi.

The pressure relief fluid flow path 80 is exposed to pressure in the valve cavity which is fluidly connected to the solar hot water system 100. The pressure relief valve 90 needle 92, seal 96, bias spring 98, spacer 100, and retainer screw 102 are assembled into the plunger end of the actuator and adjusted to apply a predetermined pressure corresponding to the desired pressure relief. When pressure in the actuator cavity 26 exceeds the predetermined pressure relief, pressure $F_3$ against the relief needle 92 and seal 96 overcomes the bias $F_4$ exerted on the needle 92 and seal 96 by the bias spring 98, moving the seal 96 and needle away from the seat 106 to allow fluid to escape axially through the pressure relief fluid flow path 80. The relief valve needle 92 and seal 96 remain displaced from the seat 106 until pressure in the actuator cavity 26 falls below the predetermined pressure relief.

The actuator guide 58 surrounds the actuator piston 60 and functions to guide the piston in its axial movement relative to the rest of the actuator body 51. The guide 58 also includes a circumferential groove 68 carrying an O-ring type seal 61 which is compressed between the guide 58 and bore 63 communicating with the actuator cavity 26. The guide 58 is received in the bore 63 and axially reciprocates in response to the opposing forces $F_1$ from the wax filled actuator and $F_2$ from the actuator bias spring 62. The guide 58 is received in the bore 63 communicating with the cavity and reciprocates in sealed relationship with this bore 63. The piston 60 is also received in a smaller diameter bore 65 communicating with the larger bore 63 which receives the guide 58. The bores 63, 65 and relationships between the piston 60, guide 58 and valve body 12 align and control axial movement of the actuator body 51 with respect to the valve housing 12. In the disclosed embodiment, the piston 60 is manufactured from stainless steel and the guide 58, cup 53 and plunger 64 are constructed of brass. The seal 61 carried by the guide 58 prevents fluid from penetrating behind the guide and entering between the piston 60 and the guide 58. Such penetration can cause corrosion over time, which is prevented by the sealed relationship between the guide 58 and the valve housing 12.

While a preferred embodiment of the disclosed freeze protection valve has been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A thermally actuated valve with integrated pressure relief comprising:
   a housing defining an inlet, an outlet, and a cavity having a longitudinal axis disposed between and in fluid communication with said inlet and outlet, said housing defining a first bore aligned with said longitudinal axis and in fluid communication with said outlet;
   an actuator disposed in said cavity and having a variable axial length between a first end and a second end, said actuator responsive to changes in temperature in said cavity to generate an axial force $F_1$ acting to increase the axial length of said actuator in response to an increase in temperature from a first temperature $T_1$ to a second temperature $T_2$, said actuator first end being fixed with respect to said housing and said actuator second end including an axially extending plunger movable with respect to said housing in response to changes in said axial force $F_1$, said plunger aligned with and extending into said first bore at temperatures above $T_2$, said plunger defining a pressure relief fluid flow path extending between said cavity and said outlet;
   a pressure sensitive valve arranged in said pressure relief fluid flow path, said pressure sensitive valve having a closed position preventing fluid communication between said cavity and said outlet at cavity pressures below a predetermined pressure P and an open position allowing fluid communication between said cavity and said outlet at cavity pressures above said predetermined pressure P;
   a seal between said plunger and said first bore, said seal arranged to prevent fluid communication between said cavity and said outlet when said plunger is received in said bore;

a return member engaged with said actuator to bias the actuator and plunger away from said bore with a bias force $F_2$ opposed to said axial force $F_1$, wherein said pressure sensitive valve is contained within and moves with said plunger, said axial force $F_1$ overcomes said bias force $F_2$ to extend said plunger into said bore at temperatures above $T_2$ and said bias force $F_2$ acts to reduce the axial length of said actuator at temperatures below $T_2$ to an axial length insufficient to project said plunger into said bore, resulting in fluid communication between said inlet and said outlet, said fluid communication having a flow rate which varies with the axial length of said actuator.

2. The thermally actuated valve of claim 1, wherein said pressure relief fluid flow path comprises a second bore coaxial with said first bore.

3. The thermally actuated valve of claim 2, wherein said second bore defines a valve seat and said pressure sensitive valve includes a piston and seal biased toward a closed position against said valve seat where said piston and seal prevent fluid communication between said cavity and said outlet, said piston and seal biased toward said closed position by a bias force $F_3$ selected to permit said piston and seal to move away from said valve seat when pressure in said cavity exceeds said predetermined pressure P.

4. The thermally actuated valve of claim 1, wherein a rate of change of said axial force $F_1$ between temperatures $T_1$ and $T_2$ is non-linear.

5. The thermally actuated valve of claim 1, wherein a rate of change of said axial force $F_1$ is non-linear and said rate of change is greater at $T_1$ than $T_2$.

6. The thermally actuated valve of claim 1, wherein said temperature $T_2$ is approximately 4° F. greater than $T_1$, and a rate of change of said axial force $F_1$ per degree change in temperature increases as said temperature declines from $T_2$ toward $T_1$.

7. The thermally actuated valve of claim 1, wherein a rate of change of said axial force $F_1$ per unit change of temperature increases as said temperature declines from $T_2$ toward $T_1$, resulting in a non-linear rate of change in the axial length of said actuator.

8. The thermally actuated valve of claim 1, wherein a rate of change of said axial length of said actuator per unit change of temperature increases as said temperature declines from $T_2$ toward $T_1$.

9. The thermally actuated valve of claim 1, wherein $T_2$ is approximately 4° F. greater than $T_1$ and a rate of change of the axial length of said actuator per degree change in temperature increases as said temperature declines from $T_2$ toward $T_1$ producing a rate of change of said flow rate through said valve that is non-linear and said rate of change of said flow rate is greatest as said temperature approaches $T_1$.

10. The thermally actuated valve of claim 1, wherein $T_2$ is approximately 36° F. and $T_1$ is approximately 32° F. and a rate of change of the axial length of said actuator per degree change in temperature increases as said temperature declines from 36° F. toward 32° F. producing a rate of change of said flow rate through said valve that is non-linear and said rate of change of said flow rate is greatest as said temperature approaches 32° F.

11. The thermally actuated valve of claim 1, wherein said axial force $F_1$ is dependent upon the volume of a thermally expansible wax material contained in said actuator, a rate of change in the volume of said wax material per unit change in temperature increasing as temperatures fall from $T_2$ toward $T_1$ and declining as temperatures increase from $T_1$ toward $T_2$.

12. The thermally actuated valve of claim 1, wherein said return member is a coil spring that is engaged between said actuator body and said housing.

13. The thermally actuated valve of claim 1, wherein said seal is compressed between said bore and said plunger in a direction that is perpendicular to a direction of plunger movement when said plunger is positioned within said bore.

14. The thermally actuated valve of claim 1, wherein said seal is compressed between said plunger and said bore and compression of said seal when said plunger is received in said bore is independent of said variable axial force $F_1$.

15. The thermally actuated valve of claim 1, wherein said plunger and bore are configured to accommodate axial movement of said plunger in said bore in response to changes in temperature above $T_2$.

16. The thermally actuated valve of claim 1, wherein said bore includes an entrance and said plunger includes a forward end, said entrance and forward end having complementary configurations to facilitate alignment of said plunger with said bore and entry of said plunger into said bore.

17. The thermally actuated valve of claim 1, wherein said seal is a polymeric O-ring compressed between said plunger and said bore.

18. The thermally actuated valve of claim 1, wherein said housing comprises an upper portion rigidly attached to a lower portion, each of said upper and lower portions defining a portion of said cavity.

19. The thermally actuated valve of claim 1, wherein said input is connected to a liquid source and $T_1$ is the freezing temperature of said liquid.

* * * * *